United States Patent [19]
Nyfelt

[11] Patent Number: 5,563,453
[45] Date of Patent: Oct. 8, 1996

[54] METHOD AND ARRANGEMENT FOR REMOTELY CONTROLLING ONE OR MORE FUNCTIONS OF A MOTOR-DRIVEN VEHICLE

[75] Inventor: Leif Nyfelt, Skövde, Sweden

[73] Assignee: Scarinus Development AB, Skovde, Sweden

[21] Appl. No.: 295,713

[22] PCT Filed: Feb. 23, 1993

[86] PCT No.: PCT/SE93/00147

§ 371 Date: Aug. 31, 1994

§ 102(e) Date: Aug. 31, 1994

[87] PCT Pub. No.: WO93/17895

PCT Pub. Date: Sep. 16, 1993

[30] Foreign Application Priority Data

Mar. 2, 1992 [SE] Sweden ................... 9200631

[51] Int. Cl.⁶ .................................................. B60R 25/04
[52] U.S. Cl. .................... 307/10.2; 180/287; 340/426; 340/825.45; 379/58
[58] Field of Search .................. 307/9.1–10.6; 180/287, 289; 123/198 DB, 198 DC; 70/237, 277, 278, 264; 379/58, 59; 340/425.5, 426, 825.3–825.32, 825.34, 825.44, 825.45, 825.69, 825.72, 539, 860

[56] References Cited

U.S. PATENT DOCUMENTS

| | | | |
|---|---|---|---|
| 4,901,054 | 2/1990 | Waterman | 340/426 |
| 5,081,667 | 1/1992 | Drori et al. | 379/59 |
| 5,113,427 | 5/1992 | Ryoichi et al. | 307/10.1 |
| 5,307,048 | 4/1994 | Sonders | 307/10.2 |
| 5,370,201 | 12/1994 | Inubushi | 180/287 |
| 5,382,948 | 1/1995 | Richmond | 340/825.31 |
| 5,432,495 | 7/1995 | Tompkins | 340/425.5 |

FOREIGN PATENT DOCUMENTS

| | | | |
|---|---|---|---|
| 0373337 | 6/1990 | European Pat. Off. | |
| 0387581 | 9/1990 | European Pat. Off. | |
| 0395596 | 10/1990 | European Pat. Off. | |
| 0449471 | 10/1991 | European Pat. Off. | 307/10.5 |
| 2119548 | 11/1983 | United Kingdom. | |
| 2218243 | 11/1989 | United Kingdom. | |
| 2233487 | 1/1991 | United Kingdom | 307/10.5 |
| 9202911 | 2/1992 | WIPO. | |

*Primary Examiner*—Jonathan Wysocki
*Assistant Examiner*—Richard T. Elms
*Attorney, Agent, or Firm*—Nies, Kurz, Bergert & Tamburro

[57] ABSTRACT

A method and apparatus for remotely controlling one or more vehicle functions. The method includes providing a first coded signal transmitted by a cordless transmitter. The signal is received in a receiver located in the vehicle. The receiver includes a decoding device to detect and identify the code and to compare the signal code with a vehicle specific code. When agreement is found between the received code and the vehicle specific code, the receiver activates one or more electronic circuits in the vehicle through the agency of a control circuit, such as to deactivate one or more of the vehicle functions. The method also includes transmitting from the cordless transmitter a second coded signal which results in the activation of those vehicle functions that were earlier deactivated.

13 Claims, 1 Drawing Sheet

METHOD AND ARRANGEMENT FOR REMOTELY CONTROLLING ONE OR MORE FUNCTIONS OF A MOTOR-DRIVEN VEHICLE

BACKGROUND OF THE INVENTION

1. Field of the Invention

The present invention relates to a method and to an arrangement for remotely controlling one or more of the functions of a motor-driven vehicle. More particularly, the invention is concerned with fully or partially deactivating and activating a motor-driven vehicle by remote control.

2. Description of the Related Art

By partial or total deactivation of a vehicle is meant the deactivation of all vehicle functions or facilities, from the locking of certain parts of the vehicle to rendering the vehicle inoperable. By activating the vehicle is meant to bring the vehicle to an operable state from an inoperable state.

The theft of vehicles in society is progressively increasing. Furthermore, it is becoming progressively more common for the return of leasing cars and rented cars to be delayed beyond the date agreed, or for such cars not to be returned at all. There is a serious need for the prevention of theft and unauthorized use of motor-driven vehicles.

Theft against security vehicles is also becoming more usual. Naturally, there is a serious need to prevent theft or robbery of this nature.

The theft of leisure boats has also increased. Such boats are often very valuable and the possibility of finding a stolen boat is relatively limited.

The object of the present invention is to enable these problems to be greatly reduced.

SUMMARY OF THE INVENTION

The present invention thus relates to a method for remotely controlling one or more of the functions or facilities of a vehicle, and is characterized by transmitting a first coded signal with the aid of a cordless transmitter, this signal being received in a receiver in the vehicle; by including in the receiver a signal decoding means which detects and identifies said code and compares the code with a code that is specific to the vehicle concerned; and causing the receiver to activate, through the agency of a control circuit, one or more electronic circuits in the vehicle when agreement is found between the received code and the vehicle specific code in a manner such as to render one or more of the vehicle functions inoperable.

The invention also relates to apparatus for carrying out the method.

BRIEF DESCRIPTION OF THE DRAWINGS

The invention will now be described in more detail with reference to exemplifying embodiments thereof and also with reference to the accompanying drawings, in which.

DESCRIPTION OF THE PREFERRED EMBODIMENTS

The present invention can be applied to all sorts of motor-driven vehicles, such as automobiles, lorries, trucks and transport vehicles, craft, etc., and it will therefore be understood that the invention is not restricted to any particular type of vehicle, although the invention is primarily described in the following with reference to automobiles, security transport vehicles and leisure craft.

Figure 1:
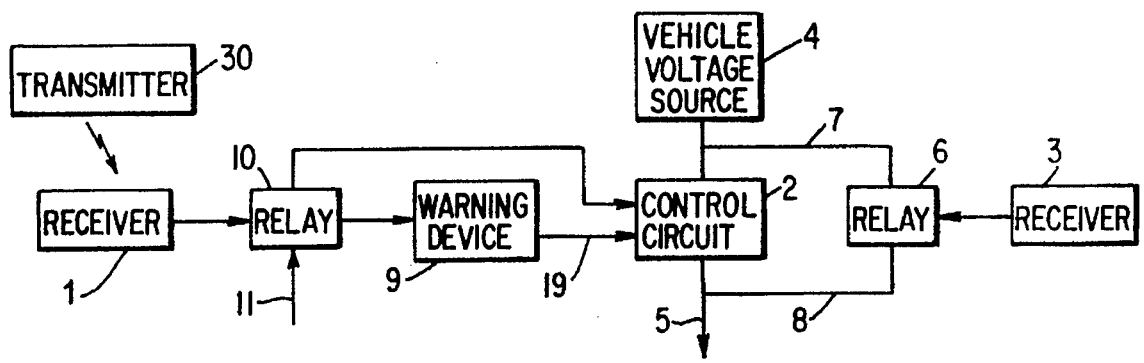
FIG. 1 is a block schematic which illustrates one embodiment of the invention.

FIG. 1 illustrates one embodiment of an inventive arrangement. The arrangement illustrated in FIG. 1 is intended to be installed in a vehicle in which the invention is applied.

The arrangement is intended to remotely control one or more of the functions of a vehicle. These functions may include one or more of the functions required to drive the vehicle. For instance, one function may involve the supply of current to the vehicle engine or to the engine fuel system. In the case of modern cars equipped with a so-called inboard computer, the computer may be programmed so that selective vehicle functions can be rendered non-functional by means of the arrangement.

Another example is that one or more functions can be added to a vehicle and these further functions can be remotely controlled by means of the inventive arrangement. For instance, the electrically maneuverable locks of the vehicle doors and windows installed in the vehicle may be constructed so that doors and windows can be remotely locked and made impossible to open from within the vehicle.

Those functions which are of interest are determined by what it is wished to achieve with the aid of the present invention.

According to the invention, the arrangement includes a first receiver 1 which is installed in the vehicle and which is intended to receive a first coded signal transmitted by a cordless transmitter 30. The receiver includes a decoding device which functions to detect and identify the code and to compare the code with a vehicle specific code. When agreement is found between the received code and the vehicle specific code, the receiver 1 functions to deliver a signal to a control circuit 2, which is intended to activate one or more electronic circuits in a manner to render one or more of the vehicle functions inoperable.

The vehicle receiver may have any suitable known construction. However, according to one further preferred embodiment of the invention, the receiver is a commercially available paging device or a mobile telephone located in the vehicle. Such a receiver will already include a decoding device and a comparator circuit which compares a call signal from a person paging system or mobile telephone network with a code which is specific to the paging device or to the mobile telephone. As will be known, paging devices and mobile telephones are constructed to produce an electric signal when called, i.e. when the comparator circuit detects similarity between the two aforesaid codes.

Of the two possibilities mentioned, it is preferred to use a paging system, because a paging device is less expensive than a mobile telephone. The invention is described in the following with reference to the embodiment in which the receiver 1 is comprised of a paging device.

According to the present invention, the arrangement includes a further receiver 3, a second receiver, of the same kind as the first-mentioned receiver, i.e. a further paging device or mobile telephone. This second receiver is also located in the vehicle and has the same function as the first-mentioned receiver. This second receiver 3 is intended to receive a second coded signal transmitted by a cordless transmitter, and is also constructed to detect and identify the code contained in the second coded signal and to compare the code with a second vehicle specific code, i.e. the code received by the second receiver. When agreement is found between the received second code and the second code specific to the vehicle, the receiver will deliver a signal to the control circuit 2. The control circuit is constructed to activate one or more electronic circuits in a manner which will render one or more of those vehicle functions that were earlier deactivated operable again.

Thus, vehicle functions can be made non-functional and subsequently reinstated to a functional mode in a remotely controlled fashion by means of the present invention.

When a paging network of known kind is used, such as the kind constructed in Sweden, this will mean that, in practice, the first vehicle-located paging device can be activated by calling a number through the network and therewith render one or more vehicle functions inoperable, and that the second vehicle-located paging device can be activated so as to bring the deactivated function back to an operable state, by calling another number.

According to one preferred embodiment of the invention, the control circuit 2 includes one or more relays which are intended to break the voltage to one or more of the electrical circuits of the vehicle, so that the vehicle engine will no longer function. In FIG. 1, the reference numeral 4 identifies the vehicle voltage source and the conductor 5 represents a conductor which extends to a vehicle operation central unit, such as the vehicle ignition system. For instance, the conductor 5 may be the conductor which controls the vehicle ignition relay. In the case of vehicles having direct injection engines, the conductor 5 may be the conductor which delivers current to the injection system.

It is preferred that the aforesaid electronic circuits include relays which function to make-and-break the supply of current to one or more devices in the vehicle. This simplifies installation and renders such installation less expensive.

The actual control circuit 2 may be a relay which is coupled so as to break the current path between the voltage source 4 and the conductor 5 when the relay receives the signal from the paging device 1, which in the case of commercial paging devices causes a loudspeaker circuit to deliver a signal to the person carrying the paging device.

With regard to the second paging device 3 of this embodiment, the device may be connected to a relay 6 which upon receipt of a signal from the paging device 3, this signal being the signal which normally operates the loudspeaker circuit of said second device, closes the current path between the voltage source 4 and the conductor 5, through conductors 7, 8. In this case, the relay 2 may be coupled so as to return to a state in which it closes the current path between the voltage source 4 and the conductor 5 when the relay 6 conducts current, i.e. when the second paging device sends a signal to the relay 6, whereupon those functions which were earlier non-functional will again be functional.

When, in accordance with a highly important embodiment of the invention, the first coded signal is received by the receiver 1, the control circuit 2 functions to first activate a warning device 9 for warning the driver of the vehicle that one or more of the vehicle functions will cease to be operable.

In the FIG. 1 embodiment, the control circuit also includes a relay 10 which is coupled so that when the vehicle ignition is switched on, the relay 10 will only conduct signals between the paging device 1 and the warning device 9, while when the ignition is switched-off, the device will only conduct signals between the paging device 1 and the relay 2. In this embodiment, the warning device is only activated when the vehicle ignition is switched on, which is necessary in order to be able to drive the vehicle. The relay 10 is conveniently controlled by a conductor 11 which carries current when the ignition is switched on, for instance a conductor 11 extending from the vehicle ignition relay.

The object of the warning device is to warn the driver of the vehicle that one or more of the vital vehicle driving functions will cease to be operable within a predetermined, short period of time. This time period may for instance have a duration of from 30 to 60 seconds. The duration of this time period is adapted to enable the driver to stop the vehicle in a safe manner before, for instance, the engine stops.

The warning device may be of any suitable kind, for instance a display which when energized will disclose to the driver that the engine will cut-out within 60 seconds.

However, according to one preferred embodiment of the invention, the warning device includes a speech device and a loudspeaker which is constructed to deliver a voice message which carries a warning. In this regard, the warning device may inform the driver that "The engine will stop within 60 seconds, due to activation of the vehicle safety system." The nature of the message delivered by the warning device will, of course, depend on the context in which the invention is applied.

The embodiment illustrated in FIG. 1 can be achieved solely with commercially available simple and inexpensive devices. For instance, the warning device may comprise a typical telephone answering device which upon receipt of a signal from the first paging device is activated to play-back a recorded warning message. Subsequent to the telephone answering device having delivered the recorded message, the device sends a signal to the control circuit 2, over a conductor 19, so as to break the connection between the voltage source 4 and the conductor 5.

According to another preferred embodiment of the invention, the control circuit includes instead a computer 12 which is constructed to control the vehicle electronic circuits through the agency of conventional output circuits.

Figure 2:
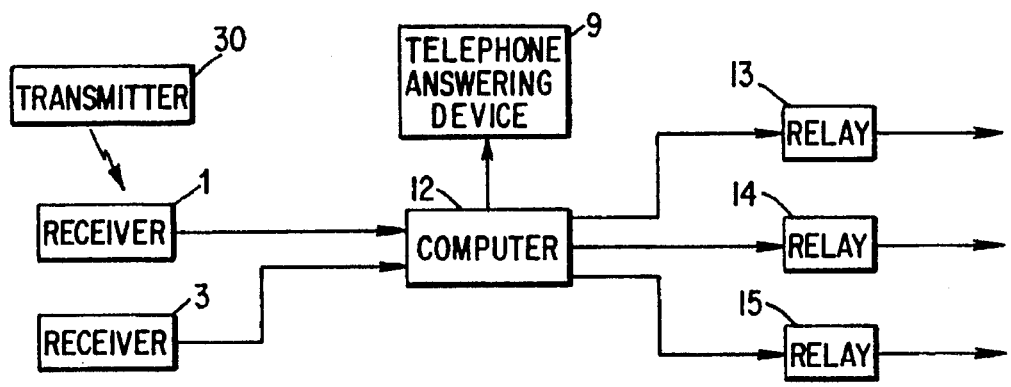
FIG. 2 illustrates another embodiment of the invention.

This embodiment is illustrated in FIG. 2. In this case, the two paging devices 1, 3 are connected to the computer 12. Those electronic circuits needed to influence vehicle functions may have the form of relays or transistor circuits. These components are referenced 13, 14 and 15 in FIGS. 2 and 3. Those skilled in this art will be aware of how such circuits can be arranged in a manner suitable for the desired purpose. The warning device may comprise a conventional telephone answering device 9, which is activated by the computer 12.

According to one particular embodiment, the computer 12 is constructed to control the vehicle locks and, when applicable, the electric window elevators, so as to lock the vehicle and to close the windows, whereafter the control circuit 12 is caused to break the voltage to one or more of the vehicle electric circuits so that the engine cannot be operated. In this case, people occupying the vehicle are unable to exit therefrom, either through doors or through windows. This embodiment finds particular advantage in vehicles that may be presumed to be hijacked by criminals, for instance security transport vehicles. Should a security transport vehicle be hijacked it may be achieved that by activating the first paging device the thieves are held within the locked vehicle at the same time as the vehicle stops. In this case, the arrangement will preferably be constructed so that a warning signal, when provided, will not be given until all doors and windows have been locked, but before the engine is stopped.

Figure 3:
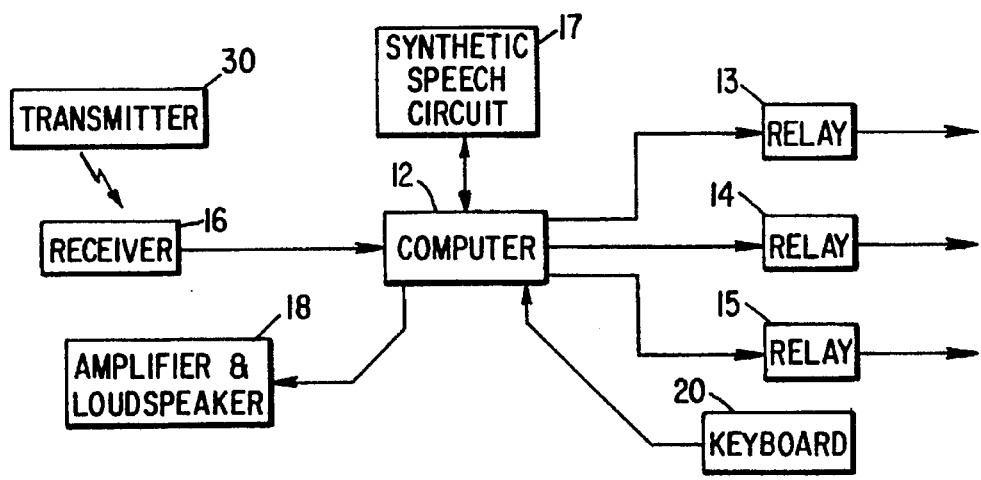
FIG. 3 illustrates a further embodiment of the invention.

FIG. 3 illustrates another exemplifying embodiment of the invention. According to this embodiment, there is used a receiver 16 which is intended to receive transmitted signals and which is also constructed to receive and decode both the first and the second coded signal. The receiver 16 is connected to a computer 12. The computer 12 is also connected to a synthetic speech circuit 17. Alternatively, the computer can be programmed to deliver a desired speech message by generating the message in synthetic speech and sending the signal to an amplifier and loudspeaker 18.

It will be obvious to all those skilled in this art that the invention can be practiced in many different forms, with respect to both the network over which the first and the second coded signal is transmitted and the functions of the vehicle to be deactivated and activated, and with respect to how a warning shall be given, when the arrangement includes such a facility.

It will thus be obvious that a vehicle can be called and therewith deactivated by means of the present invention, possibly after giving a warning. This application of the invention finds particular advantage, for instance, in the case of rented cars and leased cars which have not been returned within the contracted periods, or cars which have been purchased on credit and where the borrower has failed to keep up his/her installments. When a car which has been deactivated is found by the owner for instance, the owner is able to restore the vehicle to a functional state by calling the second paging device.

The inventive arrangement can be used in a corresponding manner on more expensive leisure boats. In this case, however, the time lapse between delivering a warning message and the time at which the boat engine is stopped may be longer, in order to provide time for the driver of the boat to moor the vessel so as not to endanger the boat unnecessarily, for instance to avoid the boat being grounded in shallow water or driven onto land.

It will also be understood that the invention can be applied in private vehicles as a supplementary anti-theft system to conventional car alarm systems. Should the vehicle be stolen, the owner is able to call the first paging device and therewith deactivate the vehicle in the aforesaid manner. The owner of the vehicle can then call the second paging device as soon as the vehicle is found.

According to one further preferred embodiment of the invention, the receiver 1, in the form of a paging device or a mobile telephone which receives the first coded signal, is constructed to send a signal to the control circuit 2 when it loses contact with the paging network or the mobile telephone network, this signal corresponding to the signal which the receiver 1 is constructed to deliver to the control circuit 2 when agreement is found between the received code and the vehicle specific code. This will result in one or more functions of the vehicle being deactivated.

Paging networks and mobile telephone networks in Sweden, and also in other countries, are relatively well limited to the territory of the country concerned. Consequently, when the vehicle passes the borders between mutually adjacent countries, the receiver will lose contact with the network and the receiver will deliver a signal to the control circuit, as before mentioned.

According to one embodiment, illustrated in FIG. 3, a keyboard 20 is connected to the computer 12. In this case, the computer 12 may be constructed so that when a predetermined code is entered through the keyboard, the computer will not activate those circuits which deactivate one or more of the vehicle functions when the receiver delivers a signal to the computer indicating that the receiver has lost contact with the network, but the computer only activates said circuits when the receiver has been called in the aforesaid manner. This makes it impossible to drive the vehicle out of the country, unless the driver is aware of said code and enters it into the computer through the keyboard.

As before mentioned, the present invention can be achieved in many ways obvious to those skilled in this art, and that the aforedescribed and illustrated embodiments are solely a few of the variants that can be achieved.

The present invention shall not therefore be considered restricted to the aforedescribed and illustrated embodiments, since modifications and variations can be made within the scope of the following claims.

I claim:

1. A method for remotely controlling one or more of the functions of a motor vehicle, including the steps of: transmitting to the vehicle through a mobile telephone network or a paging network a first coded signal with the aid of a cordless transmitter, receiving the signal in a receiver provided in the vehicle; detecting and identifying said coded signal; comparing the coded signal with a specific vehicle code; activating one or more electronic circuits in the vehicle when agreement is found between the coded signal and the specific vehicle code to deactivate one or more of the vehicle functions; activating a warning device when the vehicle receiver receives a signal indicating that one or more of the vehicle functions has been deactivated, wherein the warning device is operable to deliver a speech warning so as to warn the driver of the vehicle that one or more vehicle functions will cease to operate; and after a predetermined period of time from activation of the warning device deactivating one or more of the vehicle functions by interrupting the voltage to one or more of the vehicle electrical circuits, so that the vehicle engine can no longer operate.

2. A method according to claim 1, including the steps of: transmitting a second coded signal to the receiver in the vehicle; detecting and identifying said second coded signal; comparing said second coded signal with a vehicle specific code; and activating one or more electronic circuits in the vehicle through use of a control circuit when agreement is found between the second coded signal and the vehicle specific code, so as to activate those functions of the vehicle which were earlier deactivated.

3. A method according to claim 1, including the steps of: controlling a vehicle locking system so as to lock the vehicle, and interrupting the voltage to one or more of the vehicle electrical circuits so as to deactivate the engine of the vehicle.

4. A method according to claim 1 wherein the receiver is in the form of a paging device or a mobile telephone and including the step of: delivering a signal to a control circuit when said receiver loses contact with a paging network or a mobile telephone network, said delivered signal corresponding to the signal which the receiver delivers to the control circuit when agreement is found between the first coded signal and the specific vehicle code.

5. A method according to claim 3, including the step of operating a vehicle window elevating system to close the windows.

6. An arrangement for remotely controlling one or more of the functions of a vehicle, said arrangement comprising: a receiver which is located in the vehicle for receiving a first coded signal transmitted by a cordless transmitter; a control circuit operable to activate one or more electronic circuits in the vehicle in a manner to deactivate one or more of the vehicle functions; a decoding device included with the receiver for detecting and identifying said first coded signal and for comparing said first coded signal with a specific vehicle code; wherein the receiver is operable to deliver a signal to the control circuit when agreement is found between the first coded signal and the specific vehicle code, and wherein the receiver is responsive to network signals transmitted to the vehicle over a mobile telephone network or a paging network, wherein when the first coded signal is received by the receiver the control circuit operates to first activate a warning device including a loudspeaker for delivering a warning in the form of a speech message which warns the driver of the vehicle that one or more of the vehicle functions are about to be deactivated, and wherein the control circuit, after a predetermined time after the warning device is activated, is operated to control said electronic circuits in such a way that one or more of the vehicle functions are deactivated, the control circuit further being operable to interrupt the voltage to one or more of the vehicle electric circuits so as to deactivate the vehicle engine.

7. An arrangement according to claim 6, wherein the receiver is responsive to a second coded signal transmitted by a cordless transmitter; wherein the decoding device is operable to detect and to identify said second coded signal and to compare said second coded signal with a specific vehicle code; and wherein the receiver is operable to deliver a signal to the control circuit when agreement is found between the second coded signal and the specific vehicle code to activate one or more electronic circuits in the vehicle in a manner to reactivate one or more vehicle functions which were earlier deactivated.

8. An arrangement according to claim 6, wherein the control circuit is operable to control a vehicle locking system so that the vehicle can be locked, whereafter the control circuit is caused to interrupt the voltage to one or more of the vehicle electric circuits so as to deactivate the engine of the vehicle.

9. An arrangement according to claim 6, wherein the receiver and the decoding device are included in a paging device or a mobile telephone located in the vehicle.

10. An arrangement according to claim 6, wherein the control circuit includes a computer for controlling the electronic circuits of the vehicle.

11. An arrangement according to claim 6, wherein the electronic circuits include relays which function to break and make the supply of current to one or more electrical devices in the vehicle.

12. An arrangement according to claim 6, wherein the receiver is a paging device or a mobile telephone and is operable to receive a network signal from a paging network or a mobile telephone network and to deliver a control signal to the control circuit when the receiver fails to detect the network signal from the paging network or the mobile telephone network, said control signal corresponding to the signal which the receiver is intended to deliver to the control circuit when agreement is found between the first coded signal and the specific vehicle code.

13. An arrangement according to claim 8, wherein the control circuit is operable to control vehicle electric window elevators so that the vehicle windows can be closed.

* * * * *